United States Patent [19]

Edwards et al.

[11] 4,132,540

[45] Jan. 2, 1979

[54] PROCESS FOR REMOVING SOLVENT FROM THE RAFFINATE OF EXTRACTED PHOSPHORIC ACID AND FOR PREPARING PHOSPHATE SALTS

[75] Inventors: Robert H. Edwards, Whitehaven; Thomas A. Williams, Backermet, both of England

[73] Assignee: Albright & Wilson Limited, Oldbury, England

[21] Appl. No.: 816,891

[22] Filed: Jul. 18, 1977

[30] Foreign Application Priority Data

Jul. 27, 1976 [GB] United Kingdom ............... 31257/76

[51] Int. Cl.$^2$ ......................... C05B 7/00; C05B 11/04
[52] U.S. Cl. ........................................... 71/34; 71/36; 71/43; 423/309; 423/310; 423/313; 423/321 S
[58] Field of Search .................... 71/34, 36, 51, 42, 43, 71/40, 49; 423/321 S, 308, 309, 310, 311, 312, 313, 321 R

[56] References Cited

U.S. PATENT DOCUMENTS

| | | | |
|---|---|---|---|
| 3,019,099 | 1/1962 | Walters | 71/34 |
| 3,298,782 | 1/1967 | Olivier | 423/321 S |
| 3,367,738 | 2/1968 | Schallert et al. | 423/313 |
| 3,556,739 | 1/1971 | Bariel et al. | 423/321 S |
| 3,707,357 | 12/1972 | Chiang | 423/321 S |
| 3,813,233 | 5/1974 | Kendrick | 71/34 |
| 3,872,215 | 3/1975 | Cherdron et al. | 423/321 S |
| 3,903,247 | 9/1975 | Blumberg et al. | 423/321 S |
| 3,914,382 | 10/1975 | Williams | 423/321 S |
| 3,926,610 | 12/1975 | Kenton | 71/34 X |
| 3,937,783 | 2/1976 | Wamser et al. | 423/321 S |
| 3,956,465 | 5/1976 | Amanrich | 423/321 S |
| 3,975,178 | 8/1976 | McCullough et al. | 71/34 |
| 3,985,538 | 10/1976 | Hicks et al. | 71/34 |
| 3,988,140 | 10/1976 | Burns et al. | 71/34 |
| 3,993,733 | 11/1976 | Irani | 423/321 S X |
| 4,008,314 | 2/1977 | Davidson | 71/34 X |
| 4,024,225 | 5/1977 | Chiang | 423/321 S |

FOREIGN PATENT DOCUMENTS

| | | | |
|---|---|---|---|
| 672008 | 10/1963 | Canada | 423/321 S |
| 424849 | 10/1974 | U.S.S.R. | 71/34 |

*Primary Examiner*—Kenneth M. Schor
*Attorney, Agent, or Firm*—Flynn & Frishauf

[57] ABSTRACT

When crude wet process phosphoric acid is solvent extracted, an aqueous raffinate containing phosphoric acid and a small amount of solvent is produced as a by-product. Certain materials are added to the raffinate, in order to produce two phases, one aqueous and the other of solvent. The phases are separated, the solvent recycled for reuse in a solvent extraction process and the aqueous phase treated with ammonia or alkali or alkaline earth metal compounds to form a fertilizer or other phosphate salt.

20 Claims, No Drawings

PROCESS FOR REMOVING SOLVENT FROM THE RAFFINATE OF EXTRACTED PHOSPHORIC ACID AND FOR PREPARING PHOSPHATE SALTS

This invention relates to a process for preparing phosphate salts particularly fertilizers.

Phosphate fertilizers are prepared by treatment of wet process phosphoric acid with ammonia or an ammonium salt, to give ammonium phosphates in solution or suspension which may be sold as such or, after mixing with potassium salts to give NPK fertilizers; the aqueous systems prepared are usually dried to a solid fertilizer. The wet process acid is prepared by the action of a mineral acid, preferably sulphuric acid on phosphate rock. The acid which is ammoniated may be that produced directly with or without concentration, or that acid may be purified, e.g. by precipitation of some of the impurities. The wet process acid may also be extracted with a water immiscible organic solvent to give an organic extract containing phosphoric acid and an aqueous raffinate comprising phosphoric acid, a little solvent, and most of the impurities in the crude acid. The organic extract can be treated to recover its content of purified acid. The aqueous raffinate can be ammoniated as described above to give the fertilizers. The drying to give the solid fertilizer which may result from the effect of the heat liberated in the ammoniation, removes the water from the raffinate and also its organic solvent content, but the latter is often difficult to recover from the water vapour; in addition the presence of the solvent in the hot vapours may give rise to an explosion or fire hazard.

We have now found a method of recovering at least some of the solvent content of the aqueous raffinate during the course of production of salts, e.g. fertilizers and in so doing reducing the fire risk.

The present invention provides a process for preparing a phosphate salt, which comprises producing an aqueous phosphoric acid layer containing a water immiscible solvent and metallic impurities in equilibrium with an organic layer, which is a solution of phosphoric acid in said solvent, separating the layers, treating the aqueous layer with a material which is ammonia or an ammonium, alkali metal or alkaline earth metal base or salt to give a liquid organic solvent phase and an aqueous solution phase comprising phosphoric acid and ammonium or alkali or alkaline earth metal cations and separating said aqueous phase from said organic solvent phase. The aqueous phase contains dihydrogen phosphate anions if ammonia or a base is used and anions from said salt if the salt is used. Preferably, crude wet process acid containing metallic impurities is treated with a water immiscible organic solvent to give an organic extract layer which comprises the solvent and some of the phosphoric acid from the crude acid, and an aqueous raffinate layer, which comprises phosphoric acid, organic solvent and metallic impurities from the crude acid, the raffinate is separated from the extract, treated with ammonia or a water soluble ammonium base or salt to give an aqueous phase containing phosphoric acid and an organic solvent layer, and separating the aqueous phase from the organic solvent layer. The aqueous phase has an M:P atom ratio (where M is nitrogen, alkali metal or twice the alkaline earth metal atoms) of less than 1:1, i.e. must contain phosphoric acid and preferably contains a dihydrogen phosphate salt of ammonium or alkali or alkaline earth metal as well.

Subsequent to the separation, the aqueous phase is preferably further treated with ammonia or a water soluble ammonium and/or potassium base or salt to give a mixture of the N:P:K ratio for the desired fertilizer.

The organic layer in equilibrium with the solvent laden acid layer contains phosphoric acid usually in a concentration of at least 10%, e.g. 10–50% by weight such as 20–40% by weight.

The aqueous raffinate is preferably treated with ammonia, which may be anhydrous or aqueous ammonia, or an ammonium salt which is basic such as ammonium carbonate, ammonium bicarbonate, diammonium hydrogen phosphate, triammonium phosphate, or ammonium dihydrogen phosphate, or an ammonium salt which is not basic such as ammonium nitrate or ammonium sulphate or hydrogen sulphate; ammonium halides, e.g. ammonium chloride may be used but are preferably absent. The aqueous raffinate may be treated with the corresponding alkali metal or alkaline earth metal, e.g. potassium or sodium, basic and non basic compounds including potassium dihydrogen phosphate; potassium hydroxide and potassium sulphate are preferred. Alternatively, the aqueous raffinate may be treated with a calcium containing compound preferably a calcium base such as calcium carbonate, calcium oxide or calcium hydroxide.

The ammonium or alkali metal or alkaline earth metal compounds may be added dry or in aqueous solution or suspension. Most preferably anhydrous ammonia or other base is used; this raises the temperature of the system. Raising the temperature depresses the solubility of organic solvent in the aqueous phase still further and also speeds separation, but tends to volatilize the solvent.

The raffinate is treated to give an aqueous phase, which is a solution, and free of solid phosphate salt of ammonium or alkali metal or alkaline earth metal, said phosphate salt being either the dihydrogen phosphate or the hemiphosphate of formula $[MH_2PO_4 \cdot H_3PO_4]$. The M:P atom ratio in the aqueous phase is less than 1:1, e.g. 0.1–0.8:1 such as 0.1–0.6:1 and especially less than 0.5:1, e.g. 0.2–0.5:1. The M:P ratio is usually so chosen that the salts produced are just still soluble at that temperature to give a solution, so the M:P ratio is especially between x − 0.1:1 and x:1 where x:1 is the ratio at which the dihydrogen phosphate is just not about to crystallize at the temperature and concentration pertaining in the system. The minimum M:P ratio is that which is necessary to produce a solvent phase separate from the aqueous phase and is usually at least 0.05:1, while the maximum is that just insufficient to produce solid acid phosphate salt. Usually the M:P ratio is so chosen that the organic phase produced is substantially free of phosphoric acid. The minimum M:P ratio at which the organic phase is produced and that ratio at which no acid is in the organic layer, depends on the solvent, the temperature, the nature of the base and the amount of water in the raffinate, but can easily be determined by simple experiment, as can the maximum M:P ratio beyond which salts start to be deposited. Preferably the M:P ratio is as high as possible commensurate with an aqueous phase which is a solution not suspension and no boiling of the solvent. The higher the M:P ratio, when the raffinate is treated with ammonia or basic compound the better as the raffinate becomes hotter, but solvent tends to be lost in the vapour phase. Preferably the M:P ratio is such that the final temperature of the aqueous phase is at least 20° C., especially at least 30° C.

below the boiling point of the solvent under the given pressure conditions. Temperatures for the aqueous phase after the treatment of 10-80° C., e.g. 20-60° C., such as 40-60° C. or 20-50° C. are preferred subject to being below the boiling point of the organic phase. The mixture of aqueous and organic phases may be cooled if desired to reduce the volatilization of the solvent.

The water immiscible solvent is one which is miscible in all proportions with anhydrous phosphoric acid but not miscible with water, particularly with a solubility in water at 20° C. of less than 9% by weight. Suitable solvents are dialkyl ethers of 4-12, e.g. 6-12, carbon atoms, especially 6-8 carbon atoms, such as diethyl ether, diisopropyl ether, di n-propyl ether, di n-butyl ether and di n-amyl ether, dialkyl ketones of 5-10 carbon atoms, e.g. 5-7, especially 5 or 6, carbon atoms, such as diethyl ketone, methyl n-propyl ketone, methyl isopropyl ketone, methyl isobutyl ketone, and methyl amyl ketone, cycloaliphatic ketones of 5-7 carbon atoms such as cyclohexanone and cyclopentanone, alkanols of 4-8, e.g. 4-7 and especially 5-7 carbon atoms such as n-butanol, isoamyl alcohol, hexanols and heptanols, alkyl alkanoate esters with 1-6 carbon atoms, e.g. 3-6 carbon atoms, in the alkyl group and 2-6 carbon atoms, e.g. 2-4 carbon atoms, in the alkanoate group, such as butyl acetate and amyl acetate, trialkyl phosphates with 1-6, e.g. 3-6 carbon atoms in each alkyl group such as tributyl phosphate, and tri (alkoxy alkyl) phosphates with 1-6 carbon atoms in the alkoxy group and 2-6 carbon atoms in the alkyl group, such as tri (butoxyethyl) phosphate. The process is particularly suitable for removing solvent from aqueous raffinates which contain not more than 7% by weight of solvent (e.g. methyl isobutyl ketone or diisopropyl ether); preferably the raffinate contains less than 2% of solvent, e.g. methyl isobutyl ketone. The process may also be used with advantage with raffinates containing 7-15% by weight of solvent, e.g. butanol, amyl alcohol or cyclohexanone or a pentanone.

The concentration of phosphoric acid in the raffinate can vary over a wide range depending on the initial acidity of the crude acid, the nature of the solvent used to extract the phosphoric acid, the temperature, method of extraction used, and the degree of extraction. As a general principle the higher the carbon content of a member of a particular solvent class, the higher the acid concentration of the raffinate. The distribution of acid between solvent and an aqueous medium is also often affected by temperature, usually with less extraction at high temperatures, giving a higher raffinate concentration. The method of extraction affects the raffinate concentration since, apart from the special case of dialkyl ethers, the raffinate from two or more stage countercurrent extractions is of lower acidity than that from single stage extraction. The aqueous raffinate usually has an $H_3PO_4$ concentration in the range 20-85%, e.g. 40-75% often 50-75%.

In a preferred process an aqueous layer containing 40-75% $H_3PO_4$ and a solvent selected from dialkyl ketones of 5 or 6 carbon atoms, dialkyl ethers of 6-8 carbon atoms and alkanols of 5-7 carbon atoms, e.g. methyl isobutyl ketone, diisopropylether or isoamyl alcohol, dissolved therein is treated with ammonia or an ammonium, alkali metal or alkaline earth metal base to form a liquid solvent layer and an aqueous solution layer containing phosphoric acid and the dihydrogen phosphate salt of ammonia or said alkali or alkaline earth metal at a temperature of at least 20° C. below the boiling point of said solvent and in the absence of solid acid phosphate salt of ammonia or said alkali or alkaline earth metal, and the phases are separated. Preferably wet process phosphoric acid, e.g. of acidity 65-85% is contacted with methyl isobutyl ketone to form an organic layer containing some of the $H_3PO_4$ in the wet process acid and an aqueous layer, the layers are separated, the aqueous layer is treated with ammonia or ammonium dihydrogen phosphate to form a liquid solvent phase and an aqueous solution phase containing ammonium dihydrogen phosphate and phosphoric acid and free of solid ammonium acid phosphate, and the solvent and aqueous phases are separated. Preferably the N:P atom ratio in the aqueous phase is 0.2-0.5:1, e.g. 0.3-0.45:1.

The process of the invention has been described above particularly with reference to the aqueous raffinate layer and organic layer produced directly by contacting wet process phosphoric acid with the solvent in one or more stages. It can, however, also be applied to the aqueous phase obtained by crosscurrent scrubbing of an organic extract of wet process acid with water or purified phosphoric acid which gives a purer extract and an impurity laden aqueous phase containing solvent.

The aqueous phase and organic solvent phase prepared by treatment of the solvent containing aqueous acid layer and the ammonia, or ammonium salt or potassium compound are separated, and usually the solvent layer is recycled for reuse in the extraction, optionally after purification, e.g. by distillation.

The solvent content of the aqueous phase is less than e.g. less than one fifth of that of the aqueous layer from which it came. If desired, the solvent content can be reduced further by stripping with steam, but preferably with air, e.g. by blowing air into the aqueous phase or by passing the phase down a column up which air passes; solvent may be recovered from the used air stream if desired.

The aqueous phase, whether steam or air stripped or not, is often then treated with ammonia or an ammonium or alkali metal or alkaline earth metal compound, e.g. a sodium or potassium compound, such as a basic ammonium sodium or potassium compound or a sodium, potassium or ammonium phosphate nitrate or chloride or mixture thereof to give a system, e.g. a fertilizer body of the desired M:P ratio. Ammonia itself or any of the salts previously mentioned can be used, but preferably ammonium nitrate is used in the form of a concentrated aqueous solution. Thus preferably a base is used to treat the solvent laden acid layer and then a neutral salt is used to treat the aqueous acid phase produced. The reaction of ammonia or ammonium salt or basic salt and phosphoric acid liberates heat, which evaporates the water in the system leaving a molten mass. To the mass, if desired, is added a potassium salt or salts, such as potassium chloride, to give the mass the N:P:K ratio desired for the fertilizer. Whether or not the potassium salt is added, the molten mass is then converted into a particulate solid, e.g. by prilling, that is allowing the molten mass to fall under gravity in droplet form until the droplets solidify, or by use of a recycle granulator. Alternatively, the aqueous phase can be treated with ammonia or ammonium salt to give a system of the desired M:P ratio for a liquid fertilizer; advantageously in this case a sequestering agent such as polyphosphoric acid or acetodi-phosphonic acid or a suspending agent such as that sold under the trade name "Bentonite" is added to stop or reduce deposition of impurity precipitates. Instead of adding the sequestering or suspending agent, the treatment with ammonia or salt thereof may be continued until a precipitate of metal phosphates is formed, the precipitate may be filtered and incorporated in solid fertilizers while the filtrate may be formed into a liquid fertilizer. Further the aqueous phase can be treated with ammonia or ammonium salt to give an ammonium phosphate of fertilizer grade, e.g. ammonium dihydrogen phosphate. Alternatively, the aqueous phase can be made by treatment of the solvent laden acid with a calcium base and after separation of solvent can be treated further to form a calcium phosphate for use, e.g. as a cattle feed.

The invention is illustrated in the following Examples:

EXAMPLE 1(a)

Wet process acid containing 77.4% $H_3PO_4$ and 1.6% $H_2SO_4$ prepared by contact of Moroccan phosphate rock and sulphuric acid was extracted with methyl isobutyl ketone in a weight ratio of 1:1.33 with two stage countercurrent contact in a pair of mixer settlers as described in U.S. Pat. No. 3,914,382. The organic extract was separated from an aqueous raffinate which contained 56% $H_3PO_4$, 2.0% $H_2SO_4$, and 1.6% methyl isobutyl ketone as well as many metal impurities. The raffinate was treated with solid ammonium dihydrogen phosphate giving an organic phase and aqueous phase. Progressively samples of the aqueous phase were taken and at each time the N:P ratio in the aqueous phase was calculated. Addition of ammonium dihydrogen phosphate to give an N:P ratio of 0.39:1 gave an aqueous solution phase at about 30° C. containing 0.08% by weight of solvent but no crystals of ammonium phosphate. The organic solvent layer was separated from the aqueous phase, which was then mixed with ammonium nitrate to give a source of N and P for a fertilizer.

EXAMPLE 1(b)

Addition of ammonium dihydrogen phosphate to the raffinate in Example 1(a) to an N:P ratio of 0.3:1 gave a solvent phase and a solution phase containing 0.14% of solvent. The phases were separated.

EXAMPLE 2

The process of Example 1 was repeated with ammonia gas instead of ammonium dihydrogen phosphate to an N:P ratio of 0.3:1. The temperature of the aqueous and organic phases rose to about 60° C. The phases were separated.

What we claim is:

1. A process for preparing a phosphate salt, which comprises
   contacting crude wet process phosphoric acid with a water immiscible phosphoric acid extraction solvent in at least one stage to produce (i) an aqueous phosphoric acid layer containing said water immiscible solvent in an amount not more than 7% by weight and metallic impurities, and (ii) an organic layer, which is a solution of phosphoric acid in said solvent,
   separating the layers,
   treating said aqueous layer with a material which is ammonia or an ammonium, alkali metal or alkaline earth metal base or salt to give a liquid organic solvent phase and an aqueous solution phase comprising phosphoric acid and ammonium or alkali or alkaline earth metal cations in an atomic ratio of M:P of between 0.1:1 and 0.6:1, wherein M is ammonium, alkali metal or twice the alkaline earth metal cations, at a temperature of less than the boiling point of said water immiscible solvent, and separating said aqueous solution phase from said organic solvent phase.

2. A process according to claim 1 wherein the material is ammonia or a basic ammonium or alkali or alkaline earth metal compound or an ammonium or alkali metal or alkaline earth metal dihydrogen phosphate and forms an aqueous solution phase comprising phosphoric acid and the di hydrogen phosphate salt of ammonia or said alkali metal or alkaline earth metal.

3. A process according to claim 2 wherein said aqueous phosphoric acid layer contains not more than 2% by weight of said solvent.

4. A process according to claim 2 wherein said solvent is a ketone of 5 or 6 carbon atoms, a dialkyl ether of 6–8 carbon atoms, an alcohol of 4–7 carbon atoms or a trialkyl phosphate with 1–6 carbon atoms in each alkyl group.

5. A process according to claim 4 wherein the solvent is methyl iso butyl ketone.

6. A process according to claim 1 wherein said aqueous phosphoric acid layer is treated with ammonia or a water soluble ammonium salt.

7. A process according to claim 6 wherein said aqueous phosphoric acid layer is treated with ammonia.

8. A process according to claim 4 wherein said material used to treat said aqueous phosphoric acid layer is ammonia or ammonium dihydrogen phosphate.

9. A process according to claim 4 wherein the aqueous phase has an M:P atom ratio, wherein M is nitrogen or alkali metal or twice the alkaline earth metal atoms, of 0.2–0.5:1.

10. A process according to claim 8 wherein the aqueous phase has an M:P ratio of 0.3–0.5:1.

11. A process according to claim 1 wherein said aqueous phase which is separated from said organic solvent phase is subsequently treated with ammonia or an alkali metal or alkaline earth metal compound to form a fertilizer body of the desired M:P ratio, wherein M is nitrogen and/or alkali metal and/or twice the alkaline earth metal atoms.

12. A process according to claim 11 wherein said aqueous phosphoric acid layer is treated with ammonia or a base to form the solvent phase and aqueous acid phase which are separated and the aqueous acid phase treated with a neutral ammonium alkali metal or alkaline earth metal salt.

13. A process according to claim 8 wherein said water immiscible extraction solvent is methyl isobutyl ketone, and wherein said material used to treat said aqueous layer is ammonia or ammonium dihydrogen phosphate whereby a solvent phase and an aqueous solution phase containing ammonium dihydrogen phosphate and phosphoric acid and free of solid ammonium dihydrogen phosphate are formed.

14. A process according to claim 13 wherein the N:P atom ratio of the aqueous layer is 0.2–0.5:1.

15. A process according to claim 14 wherein said aqueous phase which has been separated from said organic solvent phase is subsequently treated with ammonia or an alkali metal or alkaline earth metal compound to form a fertilizer body of the desired M:P ratio, wherein M is nitrogen and/or alkali metal and/or twice the alkaline earth metal atoms.

16. A process according to claim 4 wherein said material is ammonia or an ammonium or alkali metal salt or base.

17. A process according to claim 8 wherein said aqueous phosphoric acid layer is treated with said material to produce said aqueous and solvent phases at a temperature of at least 20° C. below the boiling point of the solvent.

18. A process according to claim 1 wherein said material is ammonia or an ammonium or alkali metal salt or base.

19. A process for preparing a phosphate salt which comprises contacting crude wet process phosphoric acid in at least one stage with a water immiscible solvent selected from the group consisting of dialkyl ketones of 5 or 6 carbon atoms, dialkyl ethers of 6–8 carbon atoms, and alkanols of 5–7 carbon atoms, to produce (i) an aqueous layer containing 40–75% $H_3PO_4$ and not more than 7% by weight of said solvent, and (ii) an organic layer which is a solution of phosphoric acid in said solvent, separating the layers, treating said aqueous layer with ammonia or an ammonium, alkali metal or alkaline earth metal base or dihydrogen phosphate salt to form a liquid solvent phase and an aqueous solution phase containing phosphoric acid and the dihydrogen phosphate salt of ammonia or said alkali or alkaline earth metal in an atomic ratio M:P of 0.1:1–0.6:1 wherein M is ammonium, alkali metal or twice the alkaline earth metal, said liquid solvent phase and aqueous solution phase being at a temperature of at least 20° C. below the boiling point of said solvent, and said resulting aqueous solution phase being free of solid acid phosphate salt of ammonia or said alkali or alkaline earth metal, and separating said solvent phase and aqueous phase.

20. A process according to claim 19 wherein said solvent is methylisobutyl ketone, wherein said material is ammonia, and wherein said aqueous phosphoric acid layer containing said methylisobutyl ketone is treated with said ammonia to form an aqueous phase of N:P atom ratio of 0.2–0.5:1.

* * * * *